July 17, 1934.   E. B. FERRELL   1,966,491
ANTENNA SYSTEM
Filed Dec. 1, 1930
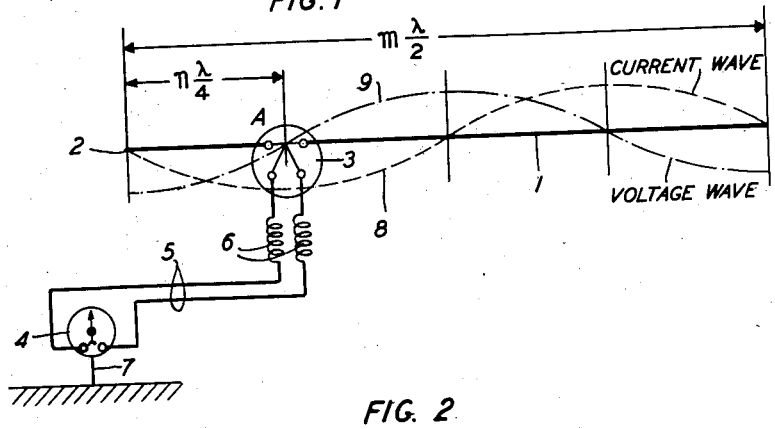
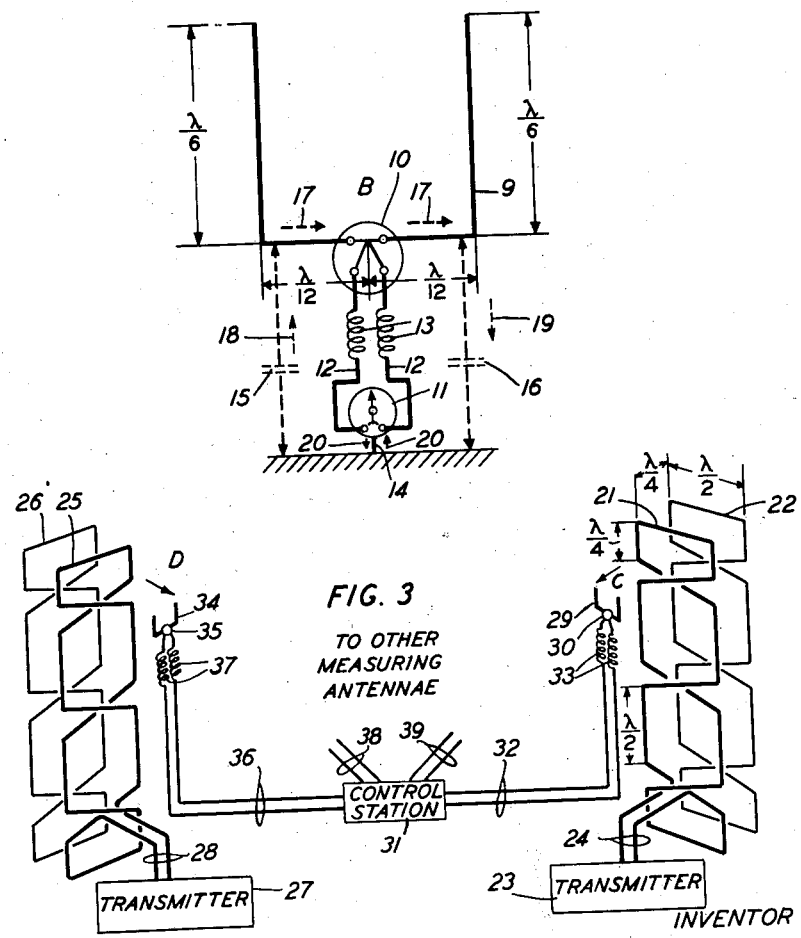
INVENTOR
E. B. FERRELL
BY Guy T. Morris
ATTORNEY Patented July 17, 1934

1,966,491

UNITED STATES PATENT OFFICE 1,966,491

ANTENNA SYSTEM

Enoch B. Ferrell, Eaton Town, N. J., assignor to Bell Telephone Laboratories, Incorporated, New York, N. Y., a corporation of New York Application December 1, 1930, Serial No. 499,212

4 Claims. (Cl. 250—33)

This invention pertains to electrical measuring systems and apparatus, particularly to such as are adapted to measure the intensity of radio waves.

In radiant energy systems, including those employing buried as well as aerial type of radiating or absorbing means, it is often desirable to measure accurately the strength of the radio waves as actually radiated or as available for absorption, that is, as existent at a certain point in the radiant energy path whether comprising ether or the earth. Ordinary measuring means directly inserted in antenna systems do not, in general, accomplish this. Moreover, present day measuring means disassociated from the antenna and employed for determining the actual wave intensity do not, in general, possess the desired degree of perfection because, among other reasons, the absorption characteristic of the measuring means employed is not conducive to obtaining the desired result.

In addition to accurately measuring the ether or earth intensity of the radio wave, it is often desirable and convenient in certain systems to accurately determine at a location distantly located from the antenna the intensity of the wave in the antenna vicinity. For example, in systems employing several transmitting or receiving antennæ distantly located from each other and operated from a single control station, efficiency and ease of operation require that the operator at the control station be able to determine the ether intensities of the various waves, quickly and accurately.

One object of this invention is to accurately measure the intensity of radio waves.

Another object of this invention is to measure at a single control point distantly located from the antennæ and with a high degree of accuracy, the intensity of radio waves transmitted from, or received by, one or several antennæ.

One feature of the invention resides in the use of an open-ended absorbing antenna, preferably of the directive type, which efficiently translates the energy in the ether waves to a form of energy adapted to actuate electrical measuring apparatus.

Another feature of the invention is the provision of means for insuring a minimum transmission loss between the absorbing antenna and the indicating apparatus.

Still another feature of the invention is a means for suppressing earth effects in the absorbing system.

In accordance with one embodiment of the invention a receiving antenna having a length preferably equal to substantially a half wave length of a radio wave desired to be measured, and symmetrically designed, is positioned relatively close to a transmitting antenna in the line of wave propagation. A thermocouple is connected to a voltage nodal point of the receiving antenna, the particular nodal point being also, preferably, the electrical balance point of the antenna. In the case of an open half wave length antenna symmetrically placed with respect to the earth, the thermocouple is connected to the antenna midpoint. The thermocouple is associated with a recording or registering device such as a galvanometer which may be located at a considerable distance from the thermocouple and may even be grounded. The transmission line conductors connecting the thermocouple and galvanometer each include a radio frequency choke coil.

The association of a thermocouple with the receiving antenna at a voltage nodal point insures a current maximum flow in the receiving antenna and hence maximum temperature difference in the thermocouple. In addition, the connection to the midpoint or electrical balance point of the antenna insures a minimum flow of radio frequency current through the thermocouple and galvanometer to ground, and hence a minimum loss in the absorbed energy. The choke coils assist in this function by their tendency to block or suppress any residual radio frequency current resulting, for example, from a slight unbalance.

The invention will be better understood from the following description taken in connection with the drawing in which:

Fig. 1 illustrates a horizontal measuring antenna and associated measuring equipment;

Fig. 2 illustrates a measuring system employing a half wave length antenna of different shape than that of Fig. 1, the measuring equipment being connected to the antenna midpoint; and Fig. 3 illustrates an arrangement for measuring at a single control station, the waves radiated from several antennae.

Referring to Fig. 1 reference numeral 1 indicates an open-ended horizontal measuring antenna, a multiple of a half wave length long. The antenna is positioned in space so as to absorb a maximum amount of energy from a given radiated wave, and it is preferably placed at a considerable distance above the earth so as to minimize the antenna-to-earth effect. At point A located an odd quarter multiple of a wave length from one extremity 2 of the antenna 1, a thermocouple 3 is inserted. The thermocouple 3 is connected to a galvanometer 4 by means of transmission line conductors 5, each of which includes one of the radio frequency choke coils 6. The midpoint of the galvanometer coil is grounded through conductor 7. The ground connection is not necessary, but it is desirable for the purpose of removing static and other pick-up currents. The letters $m$ and $n$ in the dimensional expression, represent integers, $n$ being an odd integer.

Assuming that antenna 1 is positioned so as to absorb a maximum amount of energy from a given wave, a current standing wave represented by dashed line 8 and a corresponding voltage wave represented by dashed line 9 are produced on the antenna. It will be seen that point A is a current anti-nodal point. In view of this fact, a maximum heating effect is obtained in the thermocouple 3. The temperature difference in thermocouple 3 causes a direct current having a definite relation to the standing wave produced on the antenna, to flow through galvanometer 4. Radio frequency choke coils 6 function to prevent energy from flowing between the antenna 1 and ground, through galvanometer 4, and thus materially decrease the antenna-to-earth capacity effect.

In Fig. 2, reference numeral 9 indicates a measuring antenna a half wave length long bent in the shape of a U. At the approximate center, point B of antenna 9, a thermocouple 10 is inserted. This thermocouple is connected to galvanometer 11 by means of conductors 12 each of which includes one of the radio frequency choke coils 15. The midpoint of the galvanometer coil is grounded through conductor 14 for the purpose of removing undesired energies absorbed by the line, and for balancing the antenna with respect to ground. Condensers 15 and 16 represent the capacities between the ground and the antenna portions at the left and right of point B respectively.

As in Fig. 1 the antenna shown in Fig. 2 is positioned so as to efficiently absorb energy from a given radio wave. The point B is a current anti-nodal point of the resultant standing wave, and it is also the balance point of the system. In other words, if the antenna current is in the direction of arrows 17, the current flowing from the right-hand portion of antenna 9 through the capacity represented by condenser 16 to the ground and thence through the measuring equipment comprising galvanometer 11 and associated conductors back to the antenna, is balanced by the current flowing from the left-hand portion of the antenna through the measuring equipment to ground and thence through the capacity represented by condenser 15 to the antenna. Arrows 18 and 19 represent, respectively, the direction of flow through imaginary condensers 15 and 16 respectively. Arrows 20 represent the balanced current in conductor 14. Radio frequency choke coils 13 suppress any unbalanced radio frequency current tending to flow over conductors 12.

The system shown in Fig. 2 possesses distinct advantages over measuring systems heretofore employed. First of all by associating the measuring equipment with a voltage nodal point, a galvanometer reading commensurate with the maximum current flow in the measuring antenna is obtained. In the second place, the antenna-to-earth currents are reduced to a minimum by connecting the thermocouple to the "balance" or symmetrical point of the antenna and including radio frequency choke coils in the leads from the thermocouple to the galvanometer. Finally, as compared to the system of Figure 1, the U shaped antenna absorbs vertically polarized, as well as horizontally polarized, wave components. Moreover, it permits more economy to be effected in supporting structure than the horizontal antenna of Figure 1.

In Fig. 3 a system for measuring at a single control station, waves radiated from different antennæ, is illustrated. For purposes of illustration a directive short wave antenna system such as is disclosed in the copending application of E. J. Sterba, Serial No. 382,103, filed July 30, 1929 and assigned to the applicant's assignee, is shown. Reference numerals 21 and 22 indicate, respectively, the exciter and reflector panels of such a directive transmitting antenna system. The exciter panel is connected to the transmitter 23 by means of the conductors of transmission line 24. Arrow C indicates the direction of propagation of waves emanating from this antenna system. Reference numerals 25 and 26 denote, respectively, the exciter and reflector panels of another transmitting antenna system, the exciter panels being connected to the transmitter 27 by means of transmission line 28 and arrow D indicating the direction of propagation from this system.

Reference numeral 29 denotes a U shaped measuring antenna such as shown in Fig. 2 positioned in the plane of polarization of the waves from the antenna system associated with transmitter 23 and numeral 30 denotes a thermocouple connected to the antenna at the "balance" point, which point is also a current anti-nodal point. The measuring antenna is connected to a galvanometer in the control station 31 by means of transmission line 32. Reference numeral 33 represents radio frequency choke coils inserted in the transmission line between the measuring antenna 29 and control station 31.

Similarly reference numerals 34 and 35 designate a U shaped measuring antenna and associated thermocouple, respectively, similar to the measuring antenna 29 and thermocouple 30 just described. The measuring antenna 34 is positioned so as to absorb the maximum energy radiated from the antenna system associated with the transmitter 27. The thermocouple 35 is inserted in antenna 34 at a current anti-nodal point which is also the "balance" point of the antenna, and it is connected to control station 31 by means of transmission line 36, the conductors of which each include a radio frequency choke coil 37. Reference numerals 38 and 39 represent conductors of transmission lines connecting the control station 31 with other measuring antennae (not shown on the drawing).

The operation of the system shown in Fig. 3 is obvious from the description given in connection with Figs. 1 and 2. The field strength of the waves radiated by different antennae including those associated with transmitters 23 and 27 may be simultaneously noted or recorded by an operator at the centralized control station 31. In each case an accurate reading is obtained inasmuch as only a minimum antenna current leaks to ground from the measuring antennae and a reading corresponding to the maximum amplitude of the measuring antenna current is obtained. The transmission loss between the measuring antenna and the control circuit is relatively small and is due almost entirely to the resistance of the transmission line inasmuch as direct, and not radio frequency current, is transmitted.

It should be understood that the systems shown in Fig. 3 and in Figures 1 and 2 are suitable for measuring a plurality of incoming waves and that radiation from directive or non-directive antenna may also be successfully measured.

It should also be understood that the invention is not limited to the type of antenna or type of measuring equipment illustrated, for an antenna having a different design or configuration from those shown, and other measuring equipment may be successfully employed without exceeding the scope of the invention.

What is claimed is:

1. A method of measuring the maximum intensity of the energy radiated by a transmitting antenna utilizing an open-ended U-shaped receiving antenna having a length approximately equal to a half-wave length of the radiated wave, which comprises positioning said receiving antenna so as to absorb immediately after emission, substantially, energy from both the horizontally and vertically polarized components of the radiated wave, and measuring the resulting standing wave on said receiving antenna at the current anti-nodal point.

2. A system for measuring the maximum intensity of a radio wave emitted by a transmitting antenna comprising an open-ended U-shaped antenna positioned in the plane of polarization of said wave and closely adjacent to said transmitting antenna and a current indicator electrically associated with a current anti-nodal point of said antenna, said anti-nodal point being also the electrical balance point of said antenna.

3. A system comprising a source of waves having a certain wave length, a transmitting antenna connected thereto, means for determining the strength of the radio waves transmitted comprising an open-ended antenna positioned relatively close to the transmitting antenna in the plane of wave polarization and having a length substantially equal to an odd multiple of a half of said wave length, a thermocouple connected to the approximate midpoint of said open-ended antenna, a galvanometer, leads connecting the thermocouple and galvanometer, said leads including a radio frequency choke coil, and a lead connecting the galvanometer to ground.

4. A system for measuring the intensities of a plurality of waves comprising in combination a plurality of antennae for propagating different radio wave trains, a plurality of open-ended antennae each positioned relatively close to one of the said antennae in the plane of polarization of the wave transmitted from the associated antenna, a separate current measuring means associated with the voltage nodal point of each of the antennae, radio frequency choke coils included between each measuring means and its associated open-ended antenna, said measuring means being located at one control point.

ENOCH B. FERRELL.